United States Patent
Walker et al.

(10) Patent No.: US 6,692,188 B1
(45) Date of Patent: Feb. 17, 2004

(54) RAPID EMERGENCY DAM AND METHOD OF CONSTRUCTION

(75) Inventors: Andrew Gordon Walker, Southampton (GB); Nicholas Edward Ward, Southampton (GB)

(73) Assignee: Hydroscience Holdings Limited, Fareham (GB)

(*) Notice: Subject to any disclaimer, the term of this patent is extended or adjusted under 35 U.S.C. 154(b) by 0 days.

(21) Appl. No.: 09/980,175

(22) PCT Filed: Jun. 1, 2000

(86) PCT No.: PCT/GB00/02103
§ 371 (c)(1),
(2), (4) Date: Feb. 13, 2002

(87) PCT Pub. No.: WO00/75434
PCT Pub. Date: Dec. 14, 2000

(30) Foreign Application Priority Data

Jun. 2, 1999 (GB) .............................. 9912661
Mar. 6, 2000 (GB) .............................. 0005275

(51) Int. Cl.⁷ ................................................. E02B 7/00
(52) U.S. Cl. ........................... 405/115; 405/32; 405/91; 405/110; 210/162; 256/13
(58) Field of Search ............................. 405/21, 22, 29, 405/32, 90, 91, 102, 110, 113–117; 210/154, 155, 160–169, 170; 256/13

(56) References Cited

U.S. PATENT DOCUMENTS

| 2,902,342 A | * | 9/1959 | Rehfeld ..................... 423/310 |
| 4,136,995 A |   | 1/1979 | Fish |
| 4,784,520 A | * | 11/1988 | Stevens ....................... 405/21 |
| 4,921,373 A | * | 5/1990 | Coffey ....................... 405/115 |
| 5,039,250 A |   | 8/1991 | Janz |
| 5,040,919 A | * | 8/1991 | Hendrix ..................... 405/115 |
| 5,176,468 A | * | 1/1993 | Poole ......................... 405/23 |
| 5,605,416 A |   | 2/1997 | Roach |
| 5,645,373 A | * | 7/1997 | Jenkins ....................... 405/91 |
| 5,899,632 A | * | 5/1999 | Martin ......................... 405/21 |
| 5,971,661 A | * | 10/1999 | Johnson et al. ............ 405/114 |
| 5,984,577 A | * | 11/1999 | Strong ......................... 405/114 |
| 6,079,904 A | * | 6/2000 | Trisl ........................... 405/116 |
| 6,126,362 A | * | 10/2000 | Carter et al. ................ 405/114 |
| 6,142,704 A | * | 11/2000 | Coyne ....................... 405/114 |
| 6,296,420 B1 | * | 10/2001 | Garbiso ....................... 405/111 |
| 6,332,737 B1 | * | 12/2001 | Mattson ..................... 405/118 |

FOREIGN PATENT DOCUMENTS

| DE | 3527100 | * | 2/1987 | ................ 405/115 |
| GB | 2037350 | * | 7/1980 | ................ 405/115 |

* cited by examiner

Primary Examiner—Jong-Suk (James) Lee
(74) Attorney, Agent, or Firm—Frommer Lawrence & Haug LLP; Ronald R. Santucci

(57) ABSTRACT

A rapid emergency dam is disclosed. During adverse weather conditions heavy rain can lead to rivers breaking their banks and lakes overflowing causing flooding to the surrounding countryside. Coastline defenses can also be breached by increased sea swell and large waves. A fluid barrier section (1) of the present invention comprises an elongate rectangular fluid barrier sheet 2, an apron 4 extending from the lowermost edge 6 of the fluid barrier (2), an elongate rectangular front panel (7) and support means in the form of a plurality of support ribs (8). The fluid barrier sheet (2) is of a flexible fluid impermeable material such as plastics, rubber, waterproof canvas, nylons or any other suitable natural or man made material. A preferred material for the barrier sheet (2) is a fluid impermeable tear resistant flexible foil. In one preferred embodiment of the present invention the lowermost edge (6) of the fluid barrier is bonded to one edge of the apron (4). The bond provides a fluid impermeable joint between the apron 4 and the fluid barrier sheet (2) when erected.

34 Claims, 5 Drawing Sheets

RAPID EMERGENCY DAM AND METHOD OF CONSTRUCTION

The present invention relates to a rapid emergency dam, and is concerned particularly, although not exclusively, with an emergency flood water barrier.

BACKGROUND OF THE INVENTION

During adverse weather conditions heavy rain can lead to rivers breaking their banks and lakes overflowing causing flooding to the surrounding countryside. Coastline defenses can also be breached by increased sea swell and large waves. The main form of defense against such flooding is to build a physical barrier constructed from sand bags. However, there is often little warning of flooding and the transport communications to remote locations can delay, or even prevent, the raw materials for the sand bags being delivered in time.

Another situation where a fluid barrier is required at short notice is where there has been a chemical or oil leak. In such cases it is important to prevent the spillage from spreading into neighbouring water supplies.

A barrier system may also be required to prevent the flow of particle matter such as snow or sand. A mass of small particles can move in a fluid-like manner. The movement of both snow and sand can have fluid characteristics. It is also desirable to be able to quickly erect a barrier system to prevent the movement of such matter.

U.S. Pat. No. 4,136,995 discloses a barrier comprising a plurality of spaced-apart A-frames positioned behind a barrier sheet, the barrier sheet being inclined in the direction away from an apron and from the expected flood water attack. On exposure to flood water, the A-frames substantially support the forces applied to the barrier sheet.

U.S. Pat. No. 5,605,416 discloses a foam-filled barrier structure of triangular cross-section and incorporating an apron.

U.S. Pat. No. 5,039,250 discloses a self-supporting folded stiff mesh structure for sediment control and which is capable of being furled and unfurled. In FIG. 1, supporting ribs are provided which have lower ends can be pushed into the ground to provide anchorage for the barrier.

None of these barriers is suitable to withstand the large forces associated with a flood of fluid. The present invention is directed at the problem of providing a furlable barrier structure that can be relatively quickly erected, is self-supporting when erected to await a flood, and which on exposure to a flood is capable of withstanding the forces applied by fluid pressure.

SUMMARY OF THE INVENTION

According to the invention a furlable fluid barrier section comprising a fluid barrier sheet for preventing the flow of fluid across ground, comprising lower and upper edges; an apron that is fluid impermeably connected to the lower edge of the fluid barrier sheet and extending from the lower edge in a direction facing the flow of fluid wherein the fluid barrier section is free standing when ready for use, support means for holding the fluid barrier sheet above the ground at an angle over the apron to define an open structure which is adapted to receive the flow of fluid, wherein, in use, the weight of the fluid on the apron provides a downward force on the apron; tie means adapted to connect to the upper edge of the barrier sheet; and a tie anchorage adapted to connect the apron to the tie means; wherein the apron, the tie means and the barrier sheet form a triangle in the transverse cross-section of the barrier section.

Preferably in use anchoring means for the fluid barrier section is substantially provided by the mass of a fluid on the apron.

The term 'fluid' used herein refers to any type of liquid or particulate matter that behaves in a fluid-like manner such as, but not limited to, snow, earth, mud or sand.

Preferably in use anchoring means for the tie means is substantially provided by the mass of a fluid on the apron.

Preferably the fluid barrier section comprises a porous panel that extends downwardly from the uppermost edge of the fluid barrier sheet in a direction towards the apron so forming a tent-like structure over the apron.

Preferably, the tie means comprises a number of straps.

Alternatively, the tie means is provided by the porous panel.

Preferably the porous panel comprises a mesh structure.

The lowermost edge of the porous panel preferably forms a series of fluid openings providing fluid communication to the inner space of the tent-like structure.

The support means is preferably a plurality of support members in the form a series of inverted V-shapes of which one side of the respective inverted V-shapes extends across the fluid barrier sheet. Preferably the second side of the respective inverted V-shapes extends across the porous panel.

In use the support members allow the fluid barrier section to be free standing.

Preferably the support members that extend across the fluid barrier sheet are provided with additional tie means to restrain the support members from deflection.

In an embodiment of the invention the fluid barrier section comprises a panel that extends downwardly from the uppermost edge of the fluid barrier sheet in a direction towards the apron so forming a tent-like structure over the apron, and the lowermost edge of the panel preferably forms a series of fluid openings providing fluid communication to the inner space of the tent-like structure Preferably, the panel is made of the same material as the fluid barrier sheet.

It is preferable that the fluid barrier section is formed from a single flexible sheet having a first transverse fold line to form the apron and the fluid barrier sheet section; and a second transverse fold line at the apex of the tent-like structure to form the panel section.

Alternatively, the panel and fluid barrier sheet are both formed from a single flexible sheet wherein the panel is formed by the sheet being folded at the apex of the tent-like structure.

Preferably the respective support members are held within pockets attached to the fluid barrier sheet and pockets attached to the panel.

Preferably, the pockets attached to the panels provide the tie means.

Alternatively, the panel provides the tie means.

It is preferable that the fluid barrier section comprising additional tie means comprising a plurality of straps. Each strap preferably extends from the apron to a point between the ends of a support member that extend across the fluid barrier sheet.

Preferably each strap extends between a pair support members which form the inverted V-shape.

It is preferable that each strap extends from the mid-point of the first support member, that extend across the fluid barrier sheet, to the lowermost end of the second support member of a respective inverted V-shape. There is preferably a plurality of straps extending between each pair of support members forming the inverted V-shape.

In an alternative embodiment of the present invention the support means is a plurality of support members, each member being in the form of a L-shape of which one side of the respective L-shape extends across the fluid barrier sheet. Preferably the second side of the respective L-shape extends across the apron.

Preferably the apron comprises edge anchoring means, the arrangement being such that, in use, said means substantially prevents the edge of the apron from lifting under the influence of the advancing fluid.

The edge anchoring means preferably comprises anchoring pegs placed through respective holes formed in the edge margin of the apron.

Alternatively the anchoring means comprises a mass disposed on the edge of the apron.

Preferably the mass comprises a flexible chain or cord disposed on the edge of the apron.

Preferably the apron further comprises a margin of material of a lesser thickness than the thickness of the main region of the apron. One edge of the apron preferably comprises the anchoring means. Once erected the length of the apron from the lowermost edge of the fluid barrier sheet is preferably greater than the height of the fluid barrier sheet from the ground. Preferably the length of the apron is up to ten times the height of the fluid barrier sheet.

The side edges of the margin preferably comprise attachment means, the arrangement being such that in use the attachment means secures together the respective adjacent edges of adjacent fluid barrier sections so forming a fluid seal there between.

Preferably, the fluid barrier section provides fluid energy absorbing means, the arrangement being such that in use a fluid barrier section is capable of absorbing a force exerted on the fluid barrier sheet by a fluid.

Preferably, the fluid barrier section provides fluid energy damping means, the arrangement being such that in use a fluid barrier section is capable of damping a force exerted on the fluid barrier sheet by a fluid.

The barrier sheet may comprises a sheet of mesh netting that extends downwardly from the apex of the inverted V-shaped support members.

In use the sheet mesh netting allows liquid and gasses to pass there through whilst substantially preventing particle matter such as silt, sand and/or snow from passes through the mesh netting structure.

BRIEF DESCRIPTION OF THE DRAWINGS

The present invention can be put into practice in various ways, but embodiments will now be described, by way of example only, with reference to the accompanying diagrammatic drawings in which.

DESCRIPTION OF THE PREFERRED EMBODIMENTS

Figure 1:
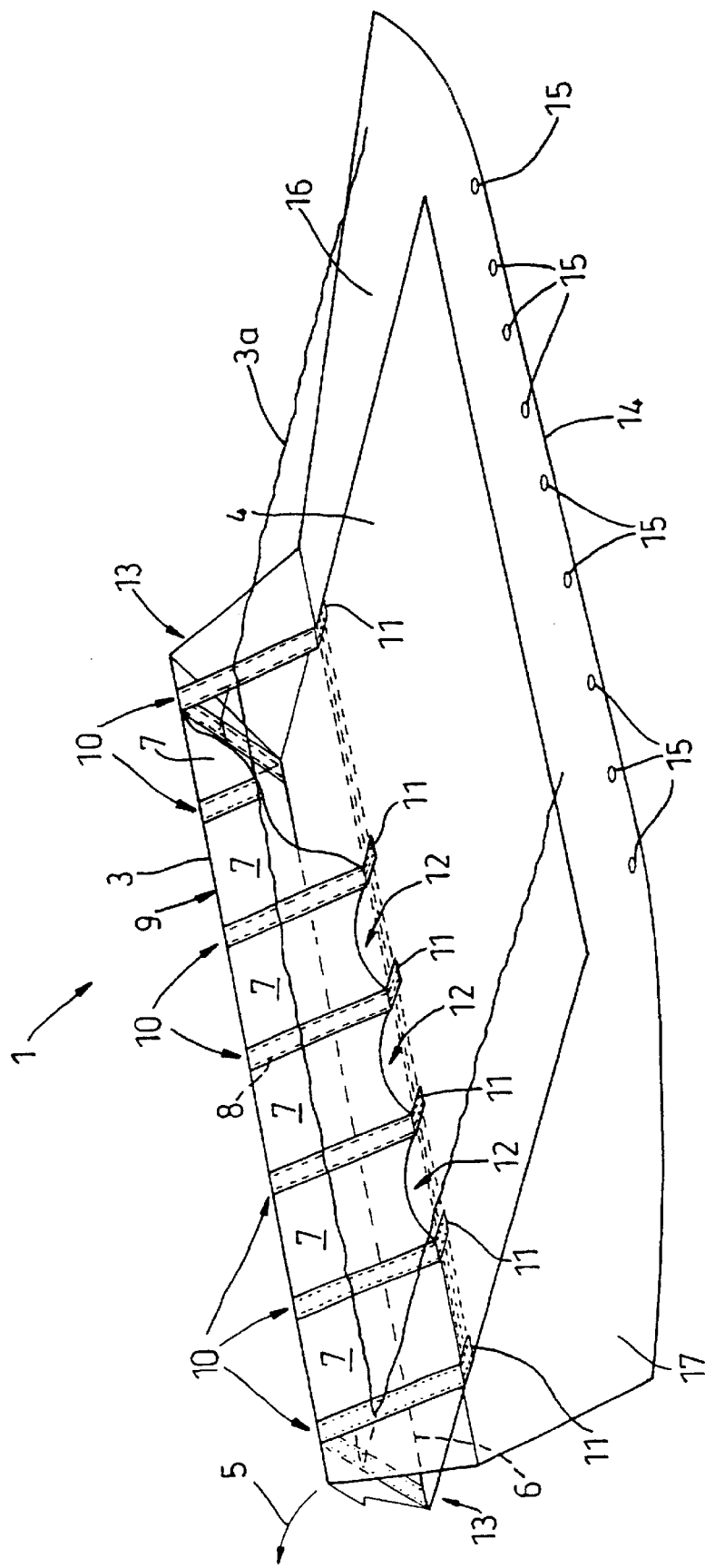
FIG. 1 shows a perspective view of an embodiment of a fluid barrier section with a cutaway section on the right hand side.
Figure 2:
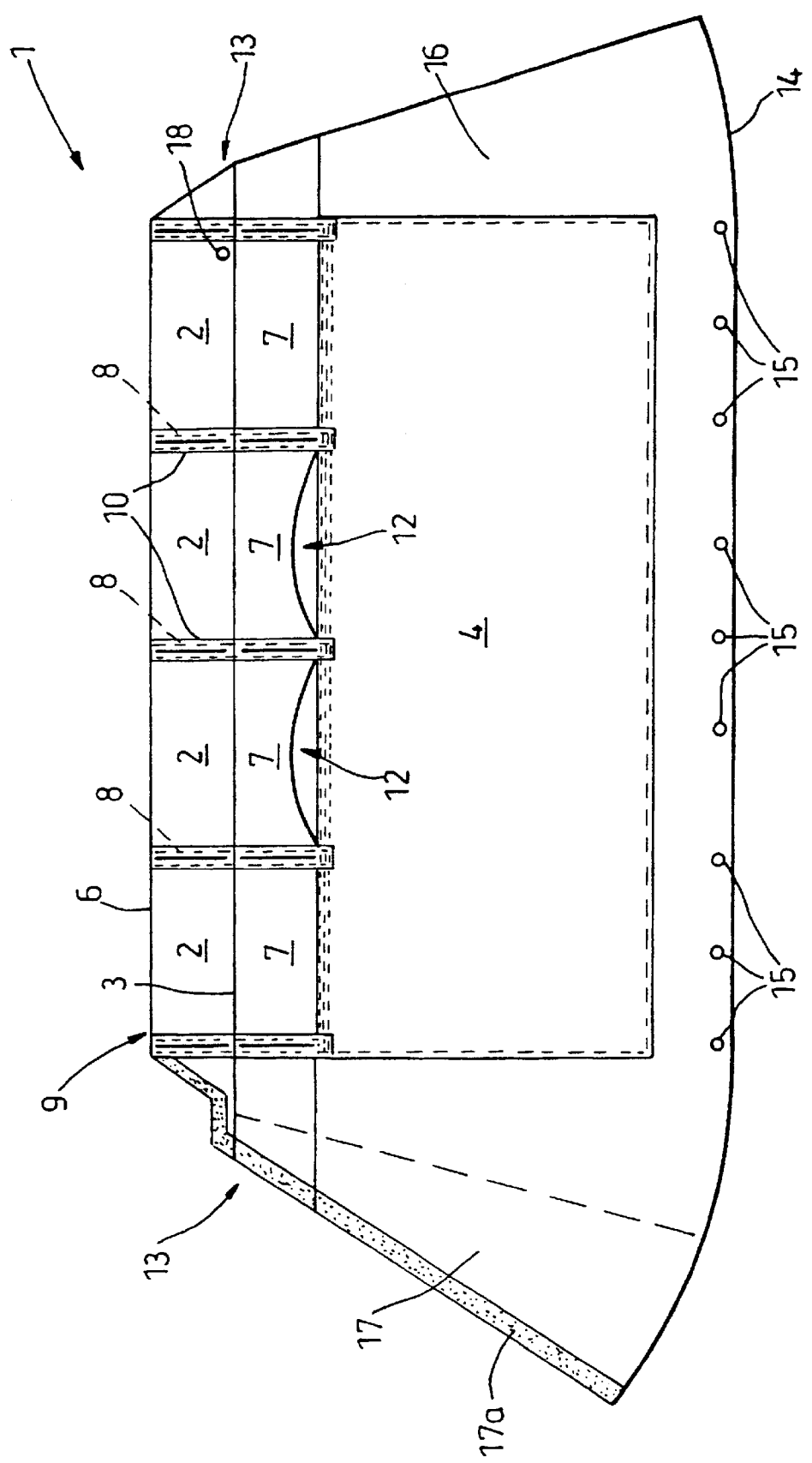
FIG. 2 shows a plan view of a shorter version of the fluid barrier section shown in FIG. 1 without the section cutaway and showing the support ribs.

Referring to FIGS. 1 and 2, a fluid barrier section 1 comprises an elongate rectangular fluid barrier sheet 2, an apron 4 extending from the lowermost edge 6 of the fluid barrier sheet 2, an elongate rectangular front panel 7 and support means in the form of a plurality of support ribs 8.

The fluid barrier sheet 2 is of a flexible fluid impermeable material such as plastics, rubber, waterproof canvas, nylons or any other suitable natural or man made material. A preferred material for the barrier sheet 2 is a fluid impermeable tear resistant flexible foil. In one preferred embodiment of the present invention the lowermost edge 6 of the fluid barrier is bonded to one edge of the apron 4. The bond provides a fluid impermeable joint between the apron 4 and the fluid barrier sheet 2.

The front panel 7 extends downwardly from the uppermost edge of the fluid barrier section 2. The uppermost edge of the front panel 7 is bonded to the uppermost edge of the fluid barrier sheet 2 so forming an apex 3 when erected. In a preferred embodiment the front panel 7 is a mesh or netting. Alternatively, the front panel 7 is of the same material as the fluid barrier sheet 2.

Any suitable method such as heat sealing, stitching by adhesive compounds or thermal welding may be used to bond together the elements of the fluid barrier section.

The support ribs 8 are held within a series of spaced pockets 10 bonded onto the surfaces of the fluid barrier sheet 2 and the front panel 7. Pairs of ribs 8 form an inverted V arrangement.

In an alternative arrangement the support ribs 8 and pockets 10 bonded to the fluid barrier sheet 2 are staggered with respect to the support ribs 8 and pockets 10 bonded to front panel 7.

One of the lowermost distal ends 11 of each pocket 10 is bonded to the apron 4. The fluid barrier sheet 2 and the front panel 7 form a tent-like structure 9 over the apron 4. The pockets 10 and ribs 8 extend from the apex 3 of the structure 9 downwardly towards the ground. The ribs 8 provide the support means to allow the structure 9 to be free standing when the fluid barrier section has been laid on the ground and erected. The ribs 8 can be of any suitable material such as, but not limited to, wood, metal, carbon fiber or plastics. The tent-like structure 9 is open at both ends 13.

The lowermost edge of the front panel 7 and the uppermost surface of the apron 4 define a series of gaps 12 which span between the respective pockets 10. The gaps 12 provide fluid access to the interior of the tent-like structure 9.

The first two adjacent pockets 10 and the last two adjacent pockets 10 at the respective ends of the front panel 7 do not have a fluid gap 12 formed there between.

Extending around three edges of the apron 4 there is a skirt 14. The skirt 14 is of a thinner material thickness than the thickness of the apron 4. This is to provide better surface sealing means.

The front margin of the skirt 14 is formed with a plurality of holes 15 through which anchoring pegs can be placed.

The skirt 14 and the apron 4 provide passive anchoring and fluid sealing means for the fluid barrier section and are preferably of the same material as the fluid barrier sheet 2. The skirt 14 is formed with two arcuate side sections 16,17.

The arcuate side section 16 extends along a side edge 4a of the apron 4 and extends along the edge of the first pair of pockets 10a forming an inverted V-shape.

The arcuate side section 17 extends along a side edge 4b of the apron 4 and along the edge of the last pair of pockets 10b forming an inverted V-shape.

When two or more fluid barrier sections 1 are placed side by side the respective side sections 16,17 overlap one another and provide fluid sealing means therebetween. In certain circumstances it may be necessary for a series of fluid barrier sections 1 to follow a tortuous path to avoid obstacles. The arcuate shape of the side sections 16,17 enables the respective fluid barrier sections 1 to be placed at an angle to one another to assist a turn or bend in the fluid barrier. The respective side sections 16,17 will be laid on each other in such an arrangement so that the flow of water across the surface of the skirt 14 does not tend to lift the edge of the side sections 16,17. The respective skirts 14 of the barrier sections 1 are held in position using any suitable method such as Velcro (™) strips 17a (see FIG. 2), or alternatively plastic zips, eyes and hooks or rope lacing.

The length of the apron 4 and the skirt 14 from the edge 6 is preferably greater than the height of the apex of the tent structure 9. It is also preferable that the length of the apron 4 and the skirt 14 from the edge 6 is about ten times the height of the apex of the tent structure 9.

A typical height of the tent structure 9 is between 1 to 2 meters. However, different sizes of tent structure and barrier section can be used depending upon the particular emergency.

A vent hole 18 is formed in the upper region of the barrier sheet 2 to allow air to escape when the flood water enters the tent-like structure through the gaps 12.

The individual fluid barrier sections 1 are rolled or folded when not in use. Due to the flexible nature of the material used the fluid barrier sections 1 can be stored or transported efficiently. To store the fluid barrier section 1 the fluid barrier sheet 2 and the front panel 7 of tent-like structure 9 are closed together and laid on top of the apron 4. The whole fluid barrier section 1 is then rolled along the edge 6 of the fluid barrier section 1 so forming a tube.

The method of deploying the fluid barrier will now be described.

To deploy a fluid barrier a first fluid barrier section 1 is unrolled. The apron 4 and front panel 7 face the direction from which the floodwater is expected to flow. The tent-like structure 9 is erected and remains upright. Anchoring pegs (not shown) are placed through the holes 15. The anchoring pegs help prevent the front edge of the skirt 14 and the apron 4 from being lifted by the advancing flood water. A second fluid barrier section 1 is then unrolled beside the first fluid barrier section 1. The respective side sections 16,17 of the two fluid barrier sections will over lay one another. The uppermost side section will be arranged such that the flow of the advancing water will not tend to lift the edge of the uppermost side section. The respective sides of the adjacent tent-like structures 9 will abut and be removably attached together by suitable means such as plastic zips or Velcro (™) strips 17a (see FIG. 2) so forming a fluid tight seal. The method of deployment is repeated until the length of the fluid barrier is sufficient.

The fluid barrier sections 1 prevent the advance of the floodwater. As the level 3a (see FIG. 1) of the water rises the downward vertical force on the apron 4 and skirt 14 increases due to the mass of the water. This increase of force provides a proportional increase in the anchoring force and fluid sealing means for the fluid barrier sections. Effectively the fluid barrier sections 1 use the weight of the flood water to keep the fluid barrier in place and prevent the flood water seeping between the ground and the underside of the apron 4 and skirt 14. The vertical force exerted on the barrier sections 1 by the flood water is distributed over the whole area of the aprons 4 of the fluid barrier sections 1.

Due to the flexible nature of the barrier sections 1 the completed fluid barrier will automatically follow the contours of the landscape on which the barrier sections 1 are placed.

It will be appreciated by the skilled person that the flood water will exert a horizontal force and a vertical force on the barrier sheet. The horizontal force will be exerted on the fluid barrier sheets 2 of the barrier sections 1 and this force will tend to push the fluid barrier sheets 2 in a direction away from the apron 4. The pockets 10 on the front panels 7 act as tie means and resist the horizontal force. As the level of the flood water rises up the fluid barrier sheets 1 the regions of the fluid barrier sections 2 that are in contact with the flood water become substantially rigid due to the water pressure. The lowermost portion of the fluid barrier sheets 2 become taut and will bulge slightly under the pressure of the flood water. The supporting function of the ribs 8 decreases as the barrier sections 1 become more rigid.

The uppermost portion of the fluid barrier sheets 2 is restrained from substantial movement in a direction 5 away from the aprons 4 by the pockets 10 bonded to the front panels 7. The pockets 10 provide tie means between the fluid barrier sheets 2 and the aprons 4. The mass of the flood water on the aprons 4 provides anchoring means for substantially restraining the pockets 10, and in particular the lowermost ends of the pockets 10, from being lifted up.

Figure 3:
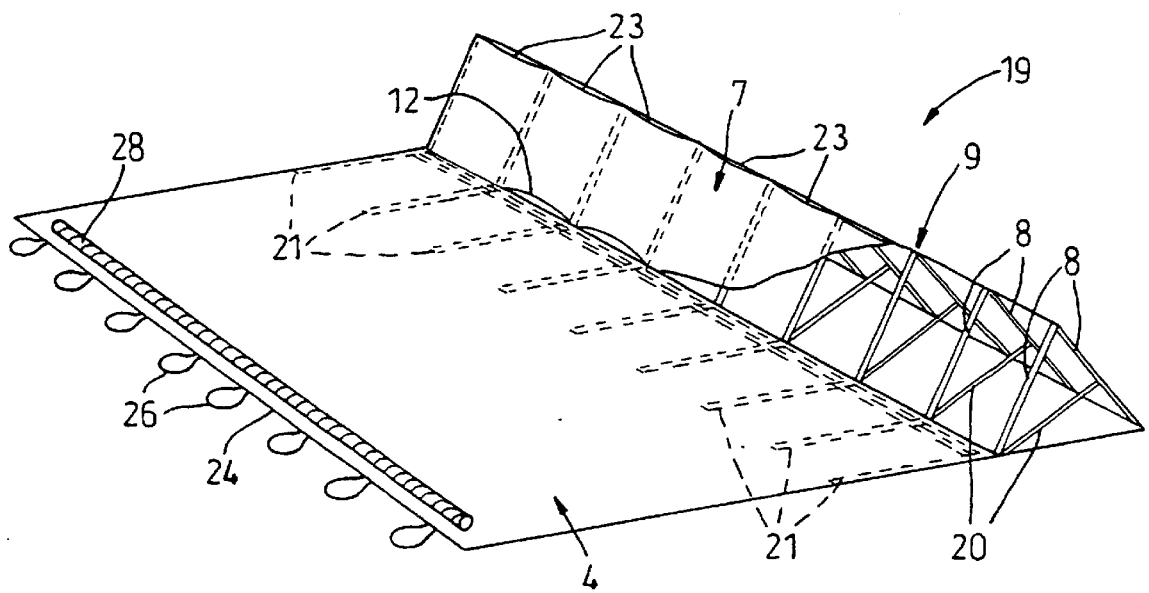
FIG. 3 shows a perspective view of a second embodiment of a fluid barrier section with a cutaway section on the right-hand side.
Figure 4:
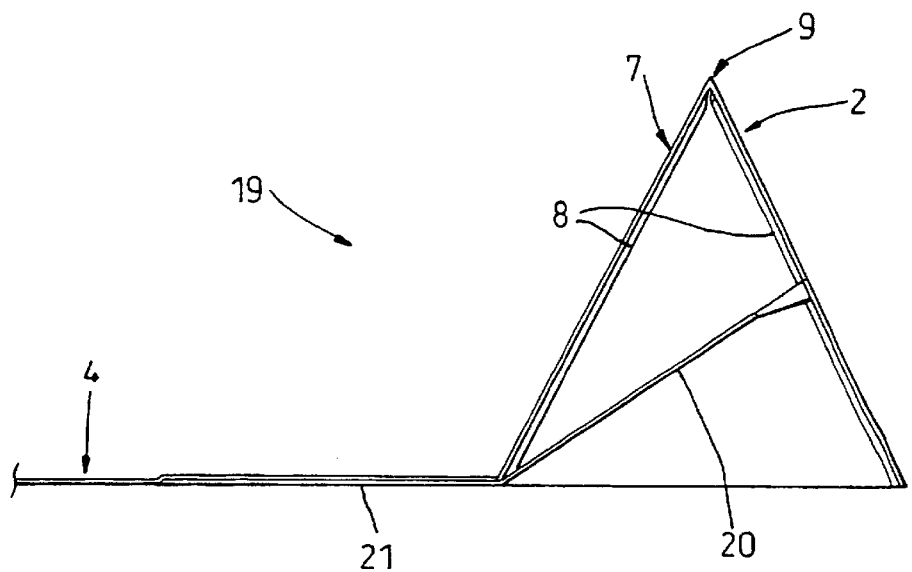
FIG. 4 shows a side view of the fluid barrier section shown in FIG. 3.

Referring to FIGS. 3 and 4, this embodiment is substantially the same as that described with reference to FIGS. 1 and 2 of the accompanying drawings and therefore similar reference numerals have been used to describe similar elements and further description of these elements will not be given. However, with this particular embodiment a fluid barrier section 19 comprises support ribs 8 that extend across the fluid barrier sheet 2 that are provided with additional bracing in the form of tie straps 20. The straps 20 extend from the mid-point of the support ribs extending across the fluid barrier sheet 2 to the lowermost end of the support ribs that extend across the front panel 7.

The tie straps 20 help prevent the support ribs 8, that extend across the fluid barrier sheet 2, from deflecting in a direction away from the apron when the flood water enters the tent-like structure 9.

One end portion 21 of the respective straps 20 is secured to the apron 4.

The uppermost region of the front panel 7 is formed with a series of venting slots 23. Each slot 23 extends between adjacent pairs of support members 8. The slots 23 provide venting means for the tent-like structure 9. When the flood water fills the inner space of the tent-like structure 9 through the gaps 12 the air within the tent-like structure can escape through the slots 23.

Attached to the front edge 24 of the apron there is a series of eight ringlets 26 and disposed on the uppermost surface of the apron 4 adjacent the edge 24 is a flexible cord 28. The cord 28 can be metal or a dense fibrous rope material. The ringlets 26 and cord 28 provide the edge 24 with anchoring means such that, in use, the advancing flood water does not lift the edge 24.

In a preferred embodiment the edge anchoring means is provided by a metal chain. Alternatively the anchoring means is provided by a flexible strip that extends from the edge 24 and is partially buried in the ground. It will be appreciated that any other suitable mass could be used to provide the anchoring means for the edge 24 such as, rocks, earth or sandbags.

It is known that flood water carries a substantial amount of silt and debris. Some of this may collect within the tent-like structure 9. After the flood waters have subsided the slots 23 provide access to wash out any debris through the gaps 12.

The present invention can be use as a barrier for solid particle matter such as, but not limited to, sand or snow. In such use the weight of the matter on the apron of the barrier provides the anchoring means for the barrier. It will be appreciated that in such use the barrier sheet 2 does not need to be a fluid barrier and a mesh or netting could be used to prevent the movement of the particle matter.

Figure 5:
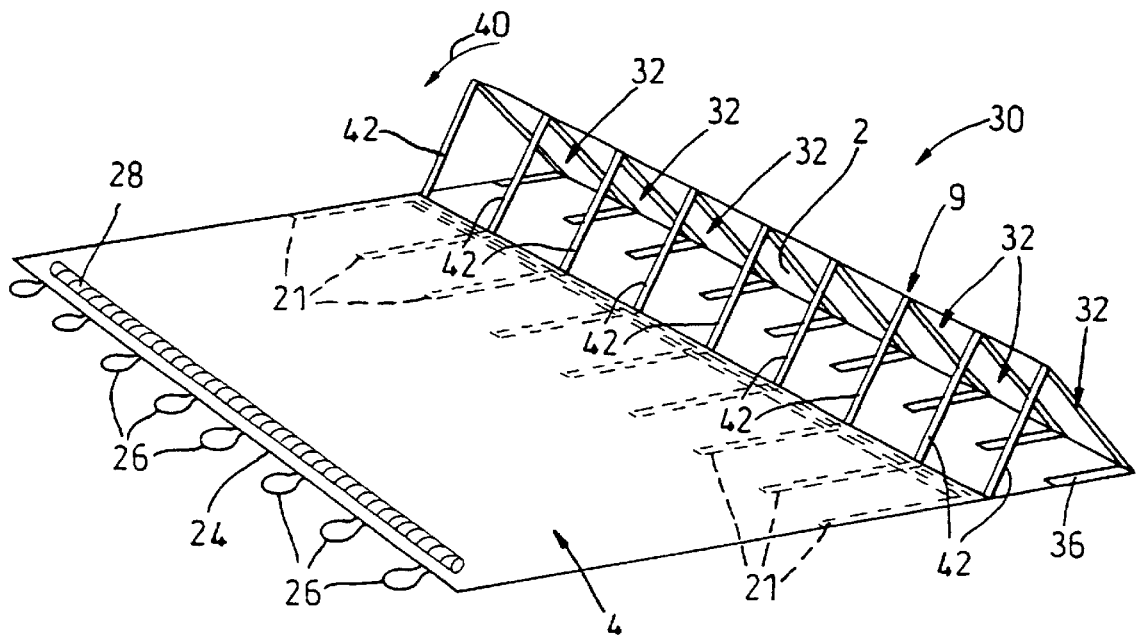
FIG. 5 shows a perspective view of a third embodiment of a fluid barrier section.
Figure 6:
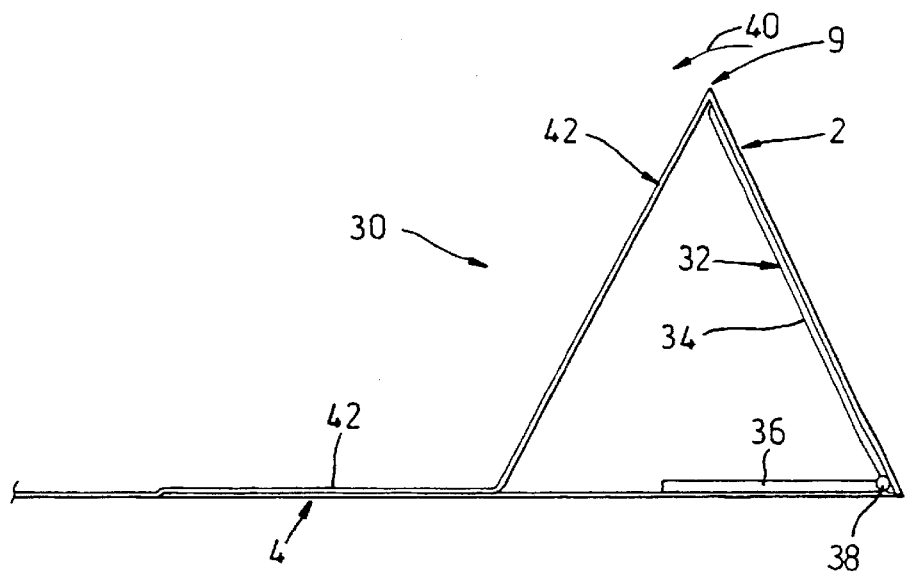
FIG. 6 shows a side view of the fluid barrier section shown in FIG. 5.
Figure 7:
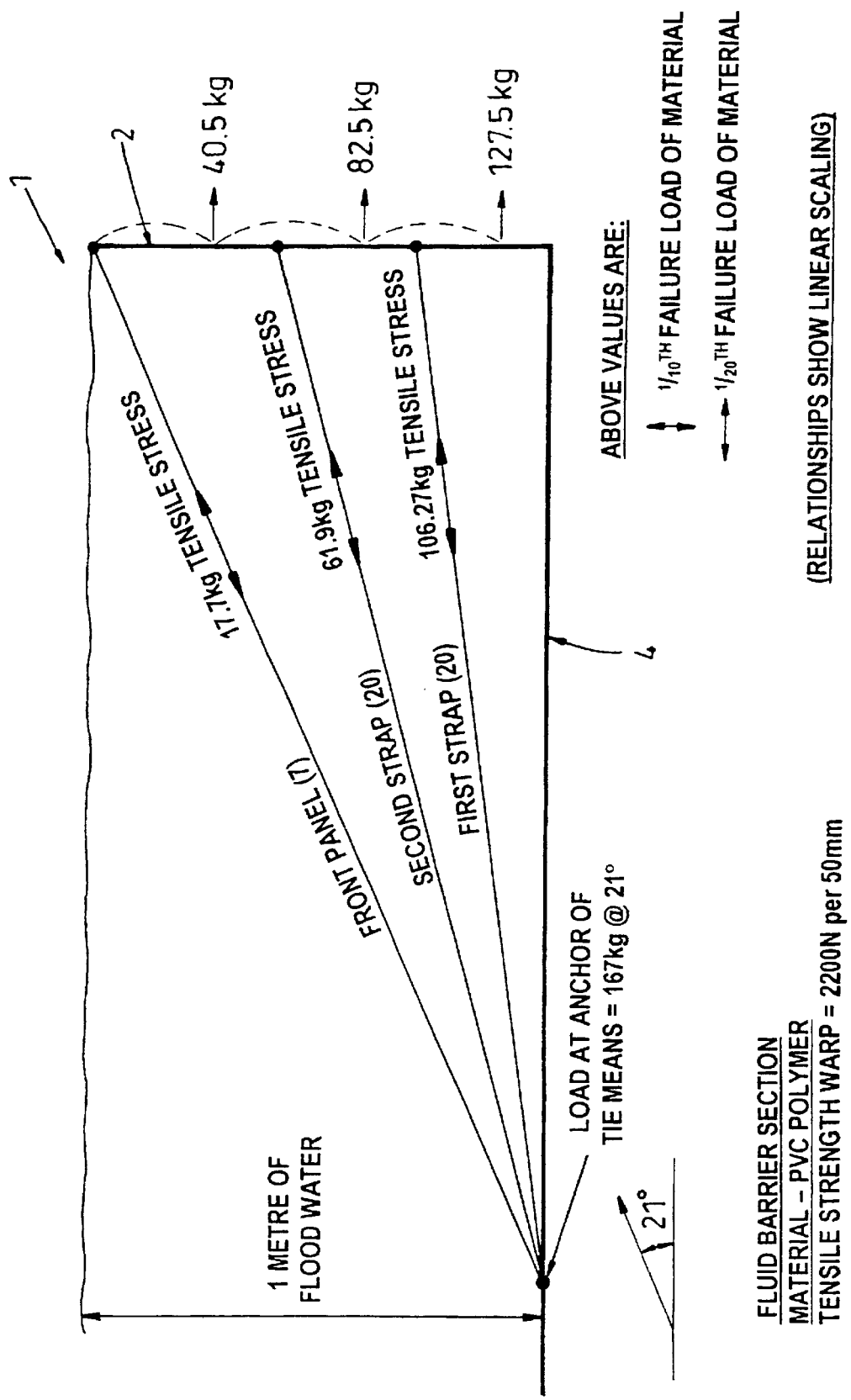
FIG. 7 shows some typical loading values for the fluid barrier section retaining one metre of flood water.

Referring to FIGS. 5 and 6, this embodiment is substantially the same as that described with reference to FIGS. 3 and 4 of the accompanying drawings and therefore similar reference numerals have been used to describe similar elements and further description of these elements will not be given. However, with this particular embodiment a fluid barrier section 30 does not include a front panel extending from the uppermost edge of the barrier sheet 2. The support means for the barrier sheet 2 is provided by a series of L-shaped devices 32. The devices 32 hold the barrier sheet 2 upwardly away from the apron 4 as shown in FIGS. 5 and 6.

Each device 32 comprises a section 34 that extends upwardly across the barrier sheet 2 and a leg section 36 that extends horizontally across the apron 4. The section 34 and the leg section 36 join each other at a pivot 38. The devices 32 are resiliently collapsible about the pivot 38. When a force is applied to the barrier sheet 2 in a direction 40 the sections 34 of the L-shaped devices 32 can be closed against the leg sections 34 so that the barrier sheet 2 can be flattened against the apron 4. The barrier section 30 may then be rolled up, or furled, to form a tube-shape.

Nine tie straps 42 each extend from the uppermost edge of the barrier sheet 2 to the apron 4. In use as the level of the flood water rises up the fluid barrier sheet 2 the lowermost portion of the fluid barrier sheet 2 becomes taut and will bulge slightly under the pressure of the flood water. The supporting function of the devices 32 will decrease as the barrier sections 1 become more rigid. The straps 42 provide tie means between the fluid barrier sheet 2 and the apron 4. The straps 42 substantially restrain the fluid barrier sheet 2 from movement in a direction opposite to the direction 40 and away from the apron 4.

Due to the flexible nature of all of the barrier section embodiments described herein the barrier sections provide fluid energy absorbing means such that in use the barrier section is capable of absorbing a force exerted on the fluid barrier sheet by the wave motion of the flood water. The barrier sections may also provide fluid energy damping means such that in use the fluid barrier section is capable of damping a force exerted on the fluid barrier sheet by the wave motion of the flood water.

It will be appreciated that all embodiments of the invention hereinbefore described can be easily and quickly erected as there is no need for specialist tools or knowledge.

What is claimed is:

1. A furlable fluid barrier section (1) comprising:
   a fluid barrier sheet (2) for preventing the flow of fluid across ground, comprising lower and upper edges;
   an apron (4) that is fluid impermeably connected to the lower edge of the fluid barrier sheet (2) and extending from the lower edge in a direction facing the flow of fluid wherein the fluid barrier section (1) is free standing when ready for use,
   support means for holding the fluid barrier sheet (2) above the ground at an angle over the apron (4) to define an open structure which is adapted to receive the flow of fluid, wherein, in use, the weight of the fluid on the apron (4) provides a downward force on the apron (4);
   tie means (10) adapted to connect to the upper edge of the barrier sheet (2); and
   a tie anchorage (11) adapted to connect the apron (4) to the tie means (10); wherein the apron (4), the tie means (10) and the barrier sheet (2) form a triangle in the transverse cross-section of the barrier section (1) when erected.

2. The furlable fluid barrier section (1) as claimed in claim 1 wherein, in use, anchoring means for the fluid barrier section (1) is substantially provided by the mass of a fluid on the apron (4).

3. The furlable fluid barrier section (1) as claimed in claim 1, wherein, in use, anchoring means for the tie means is substantially provided by the mass of a the fluid on the apron (4).

4. The furlable fluid barrier section (1) as claimed in claim 1, wherein the fluid barrier section (1) comprises a porous panel (7) comprising an upper and lower edges that extends downwardly from the upper edge of the fluid barrier sheet (2) in a direction towards the apron (4) so forming a tent-shaped structure (9) having an apex (3) and an inner space over the apron (4).

5. The furlable fluid barrier section (1) as claimed in claim 4, wherein the tie means is provided by the porous panel (7).

6. The furlable fluid barrier section (1) as claimed in claim 4, wherein the porous panel (7) comprises a mesh structure.

7. The furlable fluid barrier section (1) as claimed in claim 4, wherein the lower edge of the porous panel (7) forms a series of fluid openings (12) providing fluid communication to the inner space of the tent-shaped structure (9).

8. The furlable fluid barrier section (1) as claimed in claim 7, wherein the fluid barrier section (1) comprises additional tie means comprising a plurality of straps (20), each strap extending between a pair of support members (8) which form an inverted V-shape.

9. The furlable fluid section (1) as claimed in claim 8, wherein a first support member (8) of a pair of support members extends across the fluid barrier sheet (2) and each of the straps (20) extends from the mid-point of the first member (8) to the lowermost end of a second support member (9) of each pair of support members.

10. The furlable fluid section (1) as claimed in claim 9, wherein there is a plurality of straps (20) extending between each pair of support members forming the inverted V-shape.

11. The furlable fluid barrier section (1) as claimed in claim 4, wherein the panel (7) is made of the same material as the fluid barrier sheet (2).

12. The furlable fluid barrier section (1) as claimed in claim 11, wherein the fluid barrier section (1) is formed from a single flexible sheet having a first transverse fold line to form the apron (4) and the fluid barrier sheet (2); and a second transverse fold line at the apex (3) of the tent-shaped structure (9) to form the panel section (7).

13. The furlable fluid barrier section (1) as claimed in claim 11, wherein the panel (7) and fluid barrier sheet (2) are both formed from a single flexible sheet wherein the panel (7) is formed by the sheet being folded at the apex (3) of the tent-shaped structure (9).

14. The furlable fluid barrier section (1) as claimed in claim 1, wherein the tie means comprises a plurality of straps (10).

15. The furlable fluid barrier section (1) as claimed in claim 1, wherein the support means is a plurality of support members (8) in the form of a series of inverted V-shapes of which one side of the respective inverted V-shapes extends across the fluid barrier sheet (2).

16. The furlable fluid barrier section (1) as claimed in claim 15, wherein the support members (8) that extend across the fluid barrier sheet (2) are provided with additional tie means (20) to restrain the support members (8) from deflection.

17. The furlable fluid barrier section (1) as claimed in claim 1, wherein the support means comprises respective support members (8) held within pockets (10) attached to the fluid barrier sheet (2).

18. The furlable fluid section (1) as claimed in claim 17, wherein the fluid barrier section (1) comprises a porous panel (7) that extends downwardly from the upper edge of the fluid barrier sheet (2) in a direction towards the apron (4) so forming a tent-shaped structure (9) having an apex (3) and an inner space over the apron (4) wherein pockets (10) attached to the panel (7) provide the tie means.

19. The furlable fluid section (1) as claimed in claim 17, wherein the fluid barrier section (1) further comprises a porous panel (7) that extends downwardly from the upper edge of the fluid barrier sheet (2) in a direction towards the apron (4) so forming a tent-shaped structure (9) having an apex (3) and an inner space over the apron (4) wherein the panel (7) provides the tie means.

20. The furlable fluid barrier section (1) as claimed in claim 1, wherein the fluid barrier section (1) comprises additional tie means comprising a plurality of straps (20).

21. The furlable fluid barrier section (1) as claimed in claim 20, wherein each of the straps (20) of the additional tie means extends from the apron (4) to a point between the ends of a support member (8) that extend across the fluid barrier sheet (2).

22. The furlable fluid barrier section (1) as claimed in claim 1, wherein the support means is a plurality of support members (32), each of the support members (32) being in the form of an L-shape of which a first side (34) of the respective L-shape extends across a portion of the fluid barrier sheet (2).

23. The furlable fluid section (1) as claimed in claim 22, wherein the second side (36) of the respective L-shape extends across a portion of the apron (4).

24. The furlable fluid barrier section (1) as claimed in claim 1, wherein the apron (4) comprises edge anchoring means, the arrangement being such that, in use, said edge anchoring means substantially prevents an edge of the apron from lifting under the influence of the advancing fluid.

25. The furlable fluid section (1) as claimed in claim 24, wherein the edge anchoring means comprises anchoring pegs placed through respective holes (15).

26. The furlable fluid barrier section (1) as claimed in claim 25, wherein one edge of the apron (4) comprises the anchoring means.

27. The furlable fluid section (1) as claimed in claim 24, wherein the edge anchoring means comprises a mass disposed on the edge of the apron (4).

28. The furlable fluid section (1) as claimed in claim 27, wherein the mass comprises a flexible chain or cord (28) disposed on the edge of the apron (4).

29. The furlable fluid barrier section (1) as claimed in claim 1, wherein the apron (4) further comprises a margin (14) of material of a lesser thickness than the thickness of the main region of the apron (4).

30. The furlable fluid barrier section (1) as claimed in claim 1, wherein once erected the length of the apron (4) from the lower edge (6) of the fluid barrier sheet (2) is greater than the height of the fluid barrier sheet (2) from the ground.

31. The furlable fluid barrier section (1) as claimed in claim 1, wherein the length of the apron (4) is up to ten times the height of the fluid barrier sheet (2).

32. The furlable fluid barrier section (1) as claimed in claim 1, wherein the apron (4) further comprises a margin (14) of material having side edges (16, 17) comprising attachment means, wherein in use the attachment means secures together respective adjacent edges of adjacent fluid barrier sections (1) so forming a fluid seal therebetween.

33. The furlable fluid barrier section (1) as claimed in claim 1, wherein the fluid barrier section (1) provides fluid energy absorbing means, the arrangement being such that in use the fluid barrier section (1) is capable of absorbing a force exerted on the fluid barrier sheet (2) by a fluid.

34. The furlable fluid barrier section (1) as claimed in claim 1, wherein the fluid barrier section (1) provides fluid energy damping means, the arrangement being such that in use the fluid barrier section (1) is capable of damping a force exerted on the fluid barrier sheet (2) by a fluid.

* * * * *